United States Patent
Linkola

(10) Patent No.: US 10,306,487 B1
(45) Date of Patent: May 28, 2019

(54) OPERATIONAL PARAMETER ALLOCATION IN A WIRELESS ACCESS POINT

(71) Applicant: CSC Holdings, LLC, Bethpage, NY (US)

(72) Inventor: Janne Linkola, Brooklyn, NY (US)

(73) Assignee: CSC Holdings, LLC, Bethpage, NY (US)

( * ) Notice: Subject to any disclaimer, the term of this patent is extended or adjusted under 35 U.S.C. 154(b) by 119 days.

(21) Appl. No.: 15/190,561

(22) Filed: Jun. 23, 2016

(51) Int. Cl.
*H04W 24/02* (2009.01)
*H04W 72/04* (2009.01)
*H04W 72/10* (2009.01)

(52) U.S. Cl.
CPC ......... *H04W 24/02* (2013.01); *H04W 72/042* (2013.01); *H04W 72/10* (2013.01)

(58) Field of Classification Search
None
See application file for complete search history.

(56) References Cited

U.S. PATENT DOCUMENTS

| | | | | | |
|---|---|---|---|---|---|
| 2003/0231655 | A1* | 12/2003 | Kelton | ............... | H04N 7/17318 370/468 |
| 2005/0003827 | A1* | 1/2005 | Whelan | ................. | H04W 16/10 455/454 |
| 2006/0092889 | A1* | 5/2006 | Lyons | ................... | H04W 16/08 370/338 |
| 2006/0187865 | A1* | 8/2006 | Sakai | ................... | H04W 52/50 370/311 |
| 2007/0049319 | A1* | 3/2007 | Hart | ...................... | H04W 16/18 455/522 |
| 2008/0117875 | A1* | 5/2008 | Bennett | ................. | H04W 36/32 370/331 |
| 2008/0130555 | A1* | 6/2008 | Kalhan | ................. | H04W 88/10 370/329 |
| 2008/0279093 | A1* | 11/2008 | Hassan | ................. | H04L 1/0002 370/216 |
| 2010/0103924 | A1* | 4/2010 | Rao | ....................... | H04W 16/14 370/351 |

(Continued)

*Primary Examiner* — Kodzovi Acolatse
(74) *Attorney, Agent, or Firm* — Sterne, Kessler, Goldstein & Fox P.L.L.C.

(57) ABSTRACT

A wireless access point (WAP) efficiently adjusts one or more operational parameters, such as transmission power, a data rate, a modulation scheme, and/or an encoding scheme, to provide some examples, to provide efficient communication with one or more communication devices. This efficient allocation of the one or more operational parameters can represent a per-station allocation of the one or more operational parameters, a dynamic allocation of the one or more operational parameters, and/or a combination of the per-station allocation and the dynamic allocation. In the per-station allocation, the WAP determines and uses one or more values for the operational parameters for each of the one or more communication devices. In the dynamic allocation, the WAP monitors one or more distances between the WAP and one or more of the one or more communication devices. The WAP can continuously monitor, periodically monitor, or monitor over a discrete period of time the one or more distances. Thereafter, the WAP determines and uses one or more values for the operational parameters for each of the one or more communication devices based upon the one or more distances.

23 Claims, 6 Drawing Sheets

(56) References Cited

U.S. PATENT DOCUMENTS

Figure 1A:
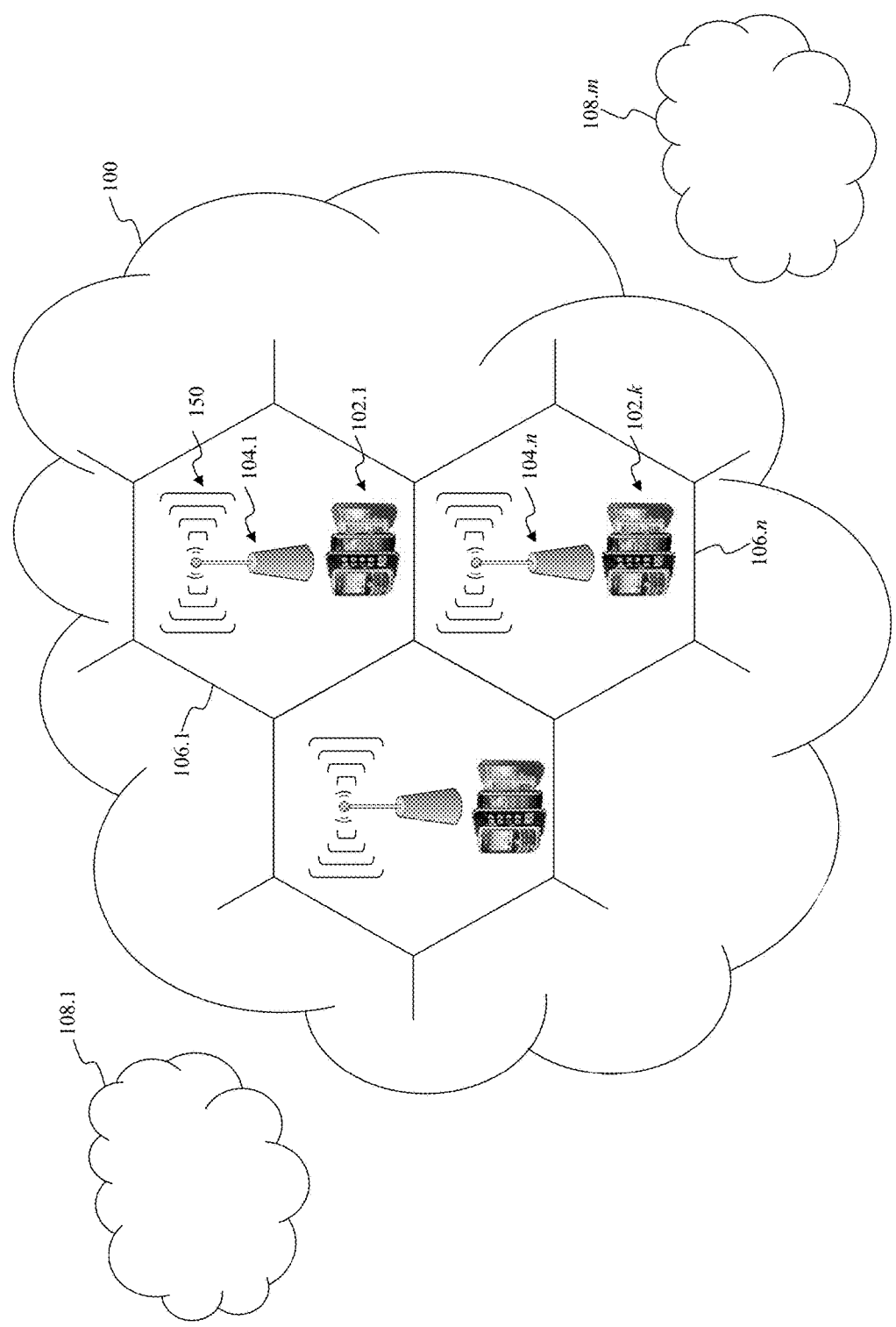

| | | | |
|---|---|---|---|
| 2010/0138549 A1* | 6/2010 | Goel | H04W 52/0225 709/228 |
| 2014/0286321 A1* | 9/2014 | Balian | H04W 12/06 370/338 |
| 2017/0303244 A1* | 10/2017 | Song | H04W 72/042 |
| 2018/0376312 A1* | 12/2018 | Linde | H04L 67/06 |

* cited by examiner

OPERATIONAL PARAMETER ALLOCATION IN A WIRELESS ACCESS POINT

BACKGROUND

Field of Disclosure

The present disclosure generally relates to a wireless network (WN) and including allocation of operational parameters within the WN.

Related Art

The continued evolution of communication devices, such as mobile communication devices or personal computing devices, has allowed these devices to communicate vast amounts of information. Traditionally, these communication devices were directly connected to each other using communication cables to support wired communication. This traditional wired communication is now being replaced by wireless communication through a conventional wireless network. The conventional wireless network represents a wireless communication network distributed over various geographical coverage areas, each geographical coverage area being served by one or more access point (APs). The conventional wireless network allows the mobile communication devices to communicate vast amounts of information without being bound to the communication cables allowing the mobile communication devices to freely move about the conventional wireless network.

BRIEF DESCRIPTION OF THE DRAWINGS/FIGURES

Figure 1B:
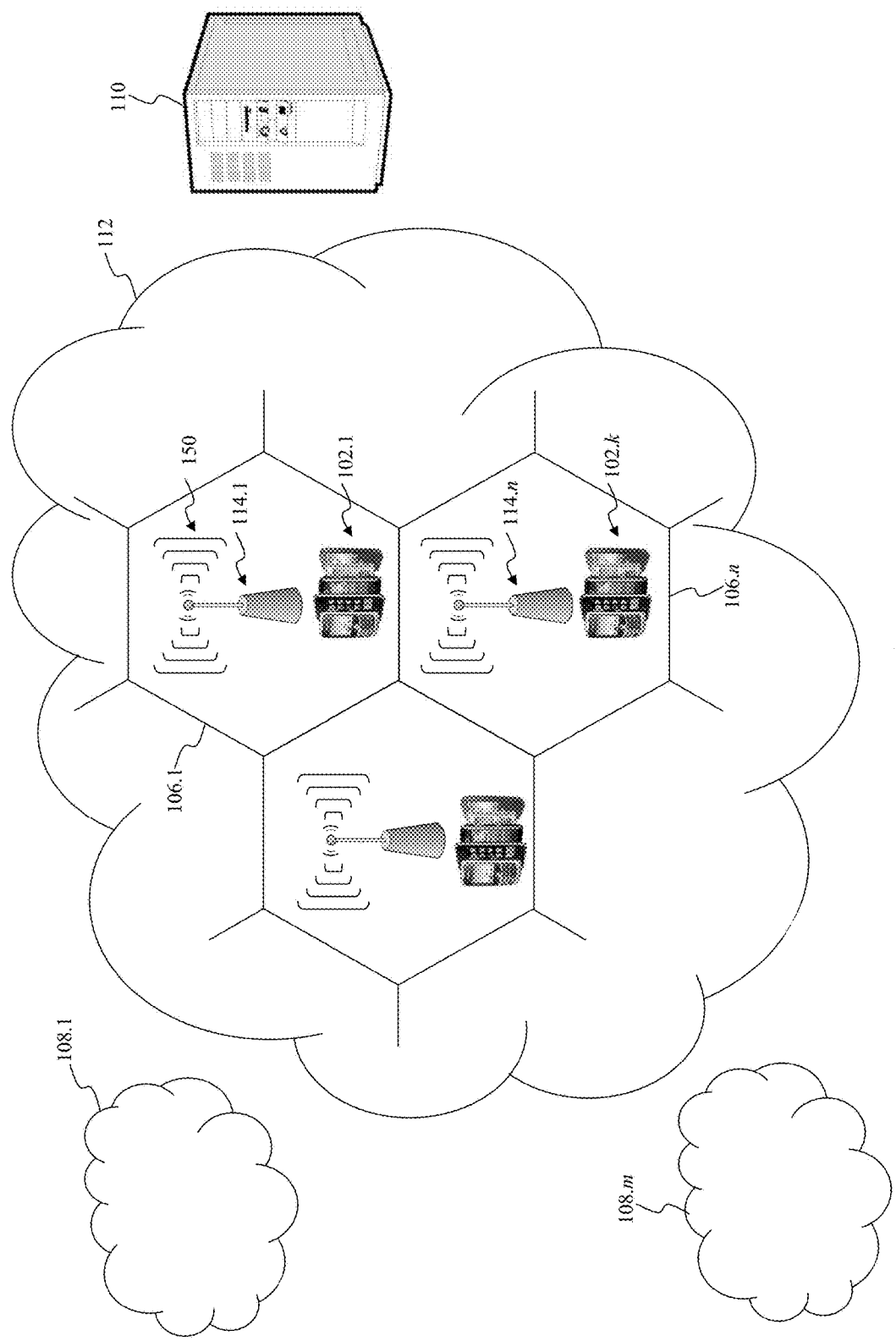
Figure 2:
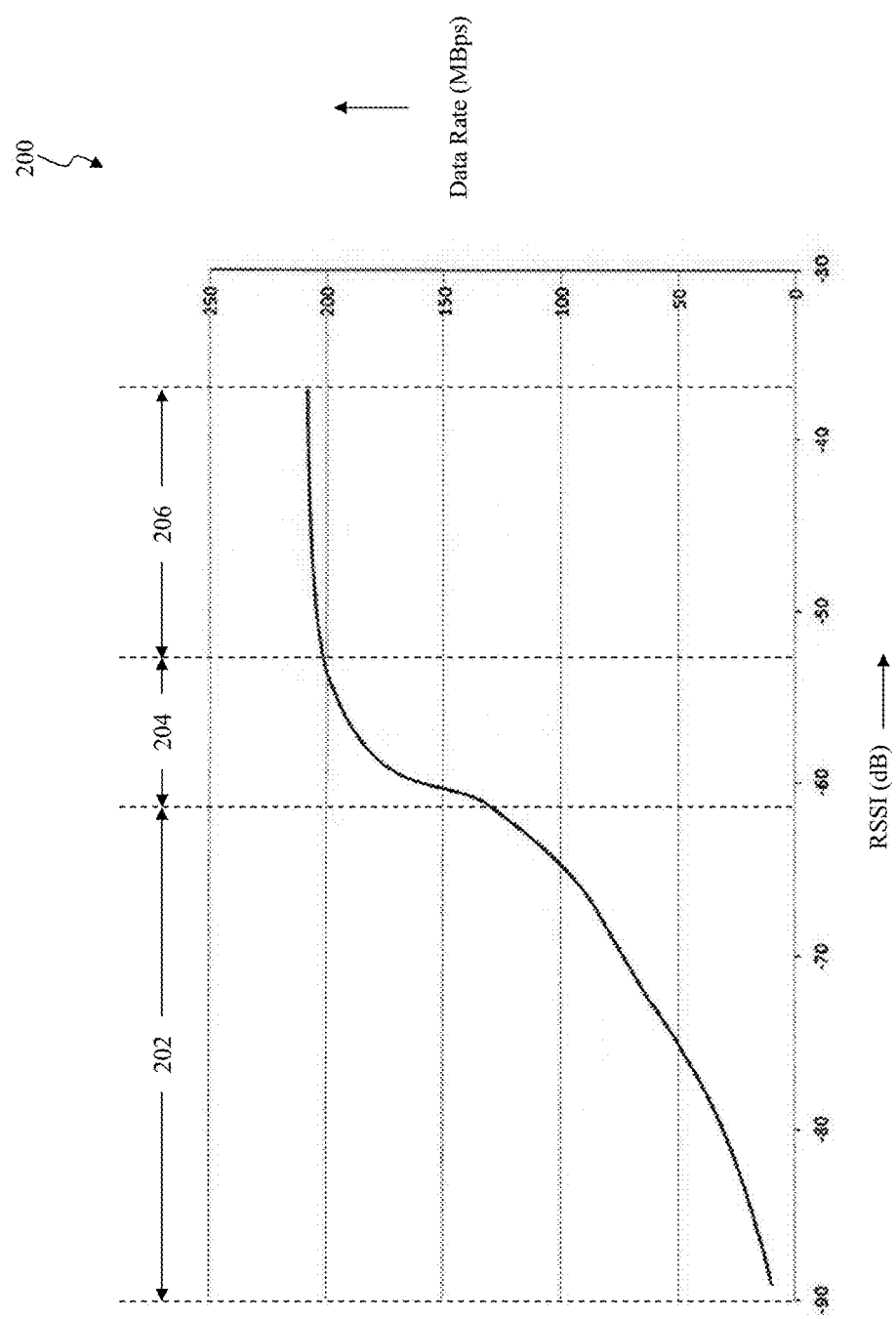
Figure 3:
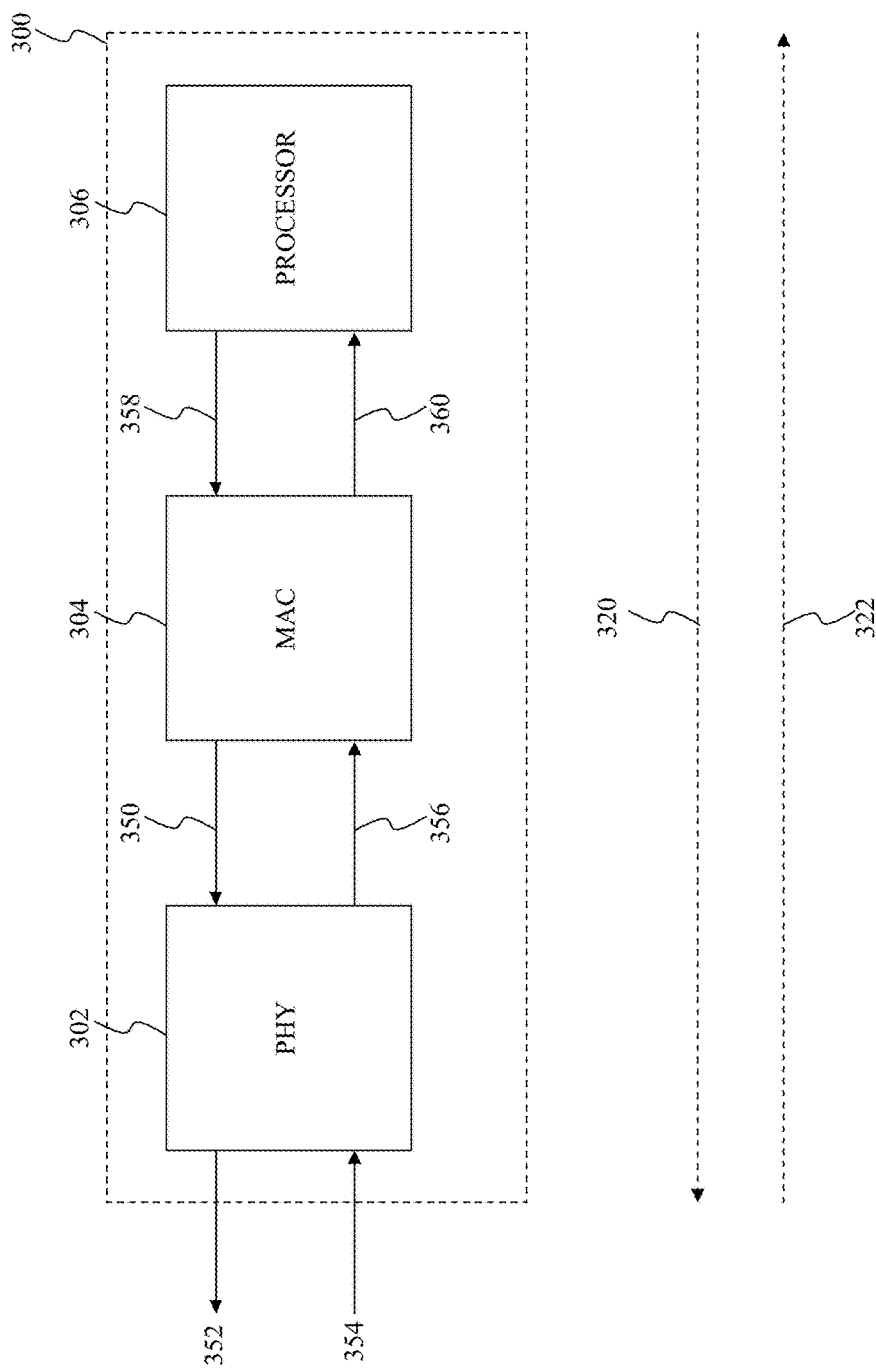
Figure 4:
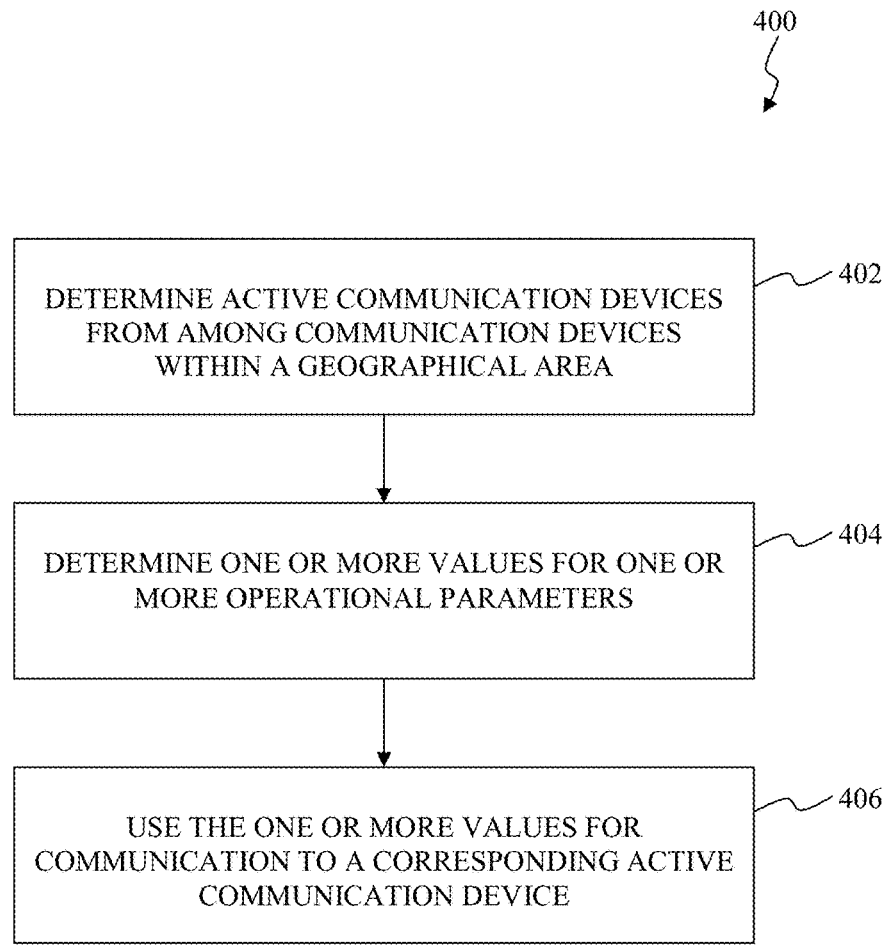
Figure 5:
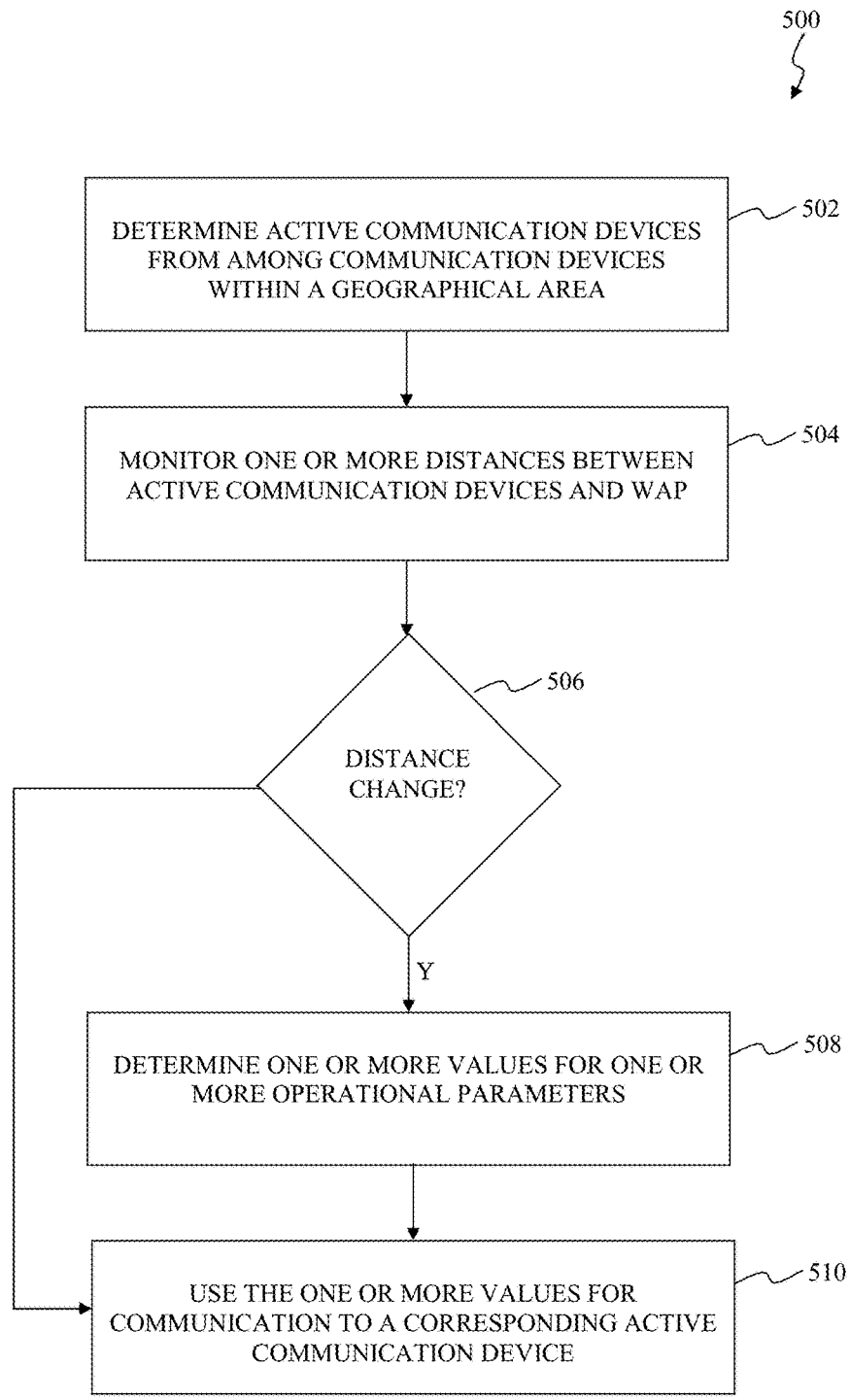

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings:

FIG. 1A graphically illustrates a first wireless network according to an exemplary embodiment of the present disclosure;

FIG. 1B graphically illustrates a second wireless network according to an exemplary embodiment of the present disclosure;

FIG. 2 illustrates an exemplary operating curve for an exemplary wireless access point (WAP) implemented within the first wireless network and/or the second wireless network according to an exemplary embodiment of the present disclosure;

FIG. 3 graphically illustrates block diagram of a wireless access point (WAP) that can be implemented within the wireless network (WN) according to an exemplary embodiment of the present disclosure;

FIG. 4 is a flowchart of exemplary operational steps of a processor within the wireless access point (WAP) in the per-station allocation according to an exemplary embodiment of the present disclosure; and FIG. 5 is a flowchart of exemplary operational steps of a processor within the wireless access point (WAP) in the dynamic allocation according to an exemplary embodiment of the present disclosure.

The present disclosure will now be described with reference to the accompanying drawings.

DETAILED DESCRIPTION OF THE DISCLOSURE

Overview

A wireless access point (WAP) efficiently adjusts one or more operational parameters, such as transmission power, a data rate, a modulation scheme, and/or an encoding scheme, to provide some examples, to provide efficient communication with one or more communication devices. This efficient allocation of the one or more operational parameters can represent a per-station allocation of the one or more operational parameters, a dynamic allocation of the one or more operational parameters, and/or a combination of the per-station allocation and the dynamic allocation. In the per-station allocation, the WAP determines and uses one or more values for the operational parameters for each of the one or more communication devices. In the dynamic allocation, the WAP monitors one or more distances between the WAP and one or more of the one or more communication devices. The WAP can continuously monitor, periodically monitor, or monitor over a discrete period of time the one or more distances. Thereafter, the WAP determines and uses one or more values for the operational parameters for each of the one or more communication devices based upon the one or more distances.

Exemplary Adaptive Wireless Networks

FIG. 1A graphically illustrates a first wireless network according to an exemplary embodiment of the present disclosure. A wireless network (WN) 100 provides wireless communication between one or more communication devices 102.1 through 102.k and wireless access points (WAPs) 104.1 through 104.n within geographical coverage areas 106.1 through 106.n. Additionally, the WN 100 is proximate to one or more other WNs 108.1 through 108.m. The one or more other WNs 108.1 through 108.m similarly include one or more WAPs communicatively coupled to one or more communication devices. In an exemplary embodiment, the one or more coverage areas of the other WNs 108.1 through 108.m can overlap with one or more of the geographical coverage areas 106.1 through 106.n.

The one or more communication devices 102.1 through 102.k can represent one or more mobile telephony devices, such as one or more mobile phones, one or more mobile computing devices, one or more mobile internet devices, such as one or more tablet computers and/or one or more laptop computers, one or more personal digital assistants, one or more handheld game consoles, one or more portable media players, one or more digital cameras, one or more pagers, one or more personal navigation devices, and/or any other suitable communication device that is capable of wireless communication within the WN 100. The geographical coverage areas 106.1 through 106.n can represent relatively small areas, such as within a person's reach, to form a one or more wireless personal area networks (WPANs), short distances within structures, such as homes, schools, computer laboratory, or office buildings, to form one or more wireless local area networks (WLANs), one or more large areas, such as between neighboring towns and cities or a city and suburb, to form one or more wireless wide area network (WWANs), and/or any combination of WPANs, WLANs, and/or WWANs that will be apparent to those skilled in the relevant art(s) without departing from the spirit and scope of the present disclosure. Although not illustrated in FIG. 1A, one or more of the geographical coverage areas 106.1 through 106.n may overlap with each other.

The WAPs 104.1 through 104.n operate in a substantially similar manner to each other; therefore; only the WAP 104.1 is described in further detail. The WAP 104.1 communicates with the one or more communication devices 102.1 within the geographical coverage area 106.1 and, in some situations, with the one or more communication devices 102.2 through 102.k within the geographical coverage areas 106.2 through 106.n in accordance with one or more communication standards or protocols. The one or more communication standards or protocols can include various wireless networking communication standards or protocols, such as a version of an Institute of Electrical and Electronics Engineers (I.E.E.E.) 802.11 communication standard, for example, 802.11a, 802.11b/g/n, 802.11h, and/or 802.11ac which are collectively referred to as Wi-Fi, an I.E.E.E. 802.16 communication standard, also referred to as WiMax, a version of a Bluetooth communication standard, a version of a ZigBee communication standard, a version of a Z-Wave communication standard, a version of a IPv6 over Low power Wireless Personal Area Networks (6LoWPAN) communication standard, a version of Insteon, an ISO/IEC 14543-3-10 communication standard, also referred to as EnOcean, and/or or any other wireless communication standard or protocol that will be apparent to those skilled in the relevant art(s) without departing from the spirit and scope of the present disclosure. The WAP 104.1 efficiently adjusts one or more operational parameters, such as transmission power, a data rate, a modulation scheme, and/or an encoding scheme, to provide some examples, to provide efficient communication with the one or more communication devices 102.1 within the geographical coverage area 106.1 and, in some situations, with the one or more communication devices 102.2 through 102.k within the geographical coverage areas 106.2 through 106.n.

This efficient allocation of the one or more operational parameters can represent a per-station allocation of the one or more operational parameters, a dynamic allocation of the one or more operational parameters, and/or a combination of the per-station allocation and the dynamic allocation. In the per-station allocation, the WAP 104.1 determines which communication devices from among the communication devices 102.1 through 102.k are active communication devices. In an exemplary embodiment, these active communication devices represent communication devices from among the communication devices 102.1 through 102.k that are associated with the WAP 104.1. Next, the WAP 104.1 determines one or more values for the operational parameters for one or more of the active communication devices. For example, the WAP 104.1 uses a first transmission power to communicate with a first active communication device from among the active communication devices. In this example, the WAP 104.1 uses a second transmission power, greater than the first transmission power, to communicate with a second active communication device, further away from the WAP 104.1 than the first active communication device, from among the active communication devices. Thereafter, the WAP 104.1 communicates with one or more active communication devices from among the active communication devices using one or more corresponding values from among the one or more values for the operational parameters. In another exemplary embodiment, the per-station allocation represents a device type based allocation of the operational parameters. In this other exemplary embodiment, each of the active communication devices can be characterized as being a type of communication device, such as, a mobile phone, a mobile computing device, or a mobile internet device to provide some examples. In this other exemplary embodiment, the WAP 104.1 determines one or more values for the operational parameters for different types of communication devices and communicates with these different types of communication devices using one or more corresponding values from among the one or more values for the operational parameters. In some situations, the type of communication device can represent a manufacturer of the communication device itself and/or different communication devices manufactured by the manufacturer.

In the dynamic allocation, the WAP 104.1 determines which communication devices from among the communication devices 102.1 through 102.k are active communication devices. In an exemplary embodiment, these active communication devices represent communication devices from among the communication devices 102.1 through 102.k that are associated with the WAP 104.1. Next, the WAP 104.1 determines and/or monitors one or more distances between the WAP 104.1 and one or more of the active communication devices. The WAP 104.1 can continuously determine and/or monitor, periodically determine and/or monitor, or determine and/or monitor over a discrete period of time the one or more distances. Thereafter, the WAP 104.1 determines one or more values for the operational parameters for one or more of the active communication devices based upon the one or more distances. For example, the WAP 104.1 uses a first transmission power to communicate with a first active communication device, at a first distance from the WAP 104.1, from among the active communication devices. In this example, the WAP 104.1 uses a second transmission power, greater than the first transmission power, to communicate with the first active communication device as the first active communication device moves to a second distance from the WAP 104.1 that is further away from the WAP 104.1 than the first distance. In an exemplary embodiment, the WAP 104.1 determines one or more ceiling values for the operational parameters, such as maximum transmission power to provide an example, for a corresponding active communication device from among the active communication devices that is furthest away from the WAP 104.1. In this exemplary embodiment, the one or more ceiling values represent a maximum and/or a minimum for the operational parameters for which the WAP 104.1 uses to determine the one or more values for the operational parameters for the remaining active communication devices from among the one or more active communication devices.

FIG. 1B graphically illustrates a second wireless network according to an exemplary embodiment of the present disclosure. A wireless network (WN) 112 provides wireless communication between the one or more communication devices 102.1 through 102.k and wireless access points (WAPs) 114.1 through 114.n within the geographical coverage areas 106.1 through 106.n. Additionally, the WN 112 is proximate to the one or more other WNs 108.1 through 108.m. The WAPs 114.1 through 114.n operate in a substantially similar manner to each other; therefore; only the WAP 114.1 is described in further detail. Additionally, the WAP 104.1 and the WAP 114.1 share many substantially similar features; therefore, only differences between the WAP 104.1 and the WAP 114.1 are to be discussed in detail below.

As illustrated in FIG. 1B, the WAP 114.1 operates using the per-station allocation of the one or more operational parameters, the dynamic allocation of the one or more operational parameters, and/or the combination of the per-station allocation and the dynamic allocation in a substantially similar manner as the WAP 104.1. However, as additionally illustrated in FIG. 1B, the WN 112 additionally includes a network server 110. The network server 110 can be situated within one or more of the geographical coverage areas 106.1 through 106.n or outside of the geographical coverage areas 106.1 through 106.n and communicates with the WAPs 114.1 through 114.n using any suitable wired communication and/or wireless communication that will be apparent to those skilled in the relevant art(s) without departing from the spirit and scope of the present disclosure. The network server 110 can represent multiple servers distributed within a single geographic location, such as a premises of a service provider, or the multiple servers can be distributed among multiple geographic locations. Instead of performing the per-station allocation of the one or more operational parameters, the dynamic allocation of the one or more operational parameters, and/or the combination of the per-station allocation and the dynamic allocation in its entirety as does the WAP 104.1, the WAP 114.1 utilizes the network server 110 to perform some of the operations of the per-station allocation of the one or more operational parameters, the dynamic allocation of the one or more operational parameters, and/or the combination of the per-station allocation and the dynamic allocation. For example, instead of determining the one or more values for the operational parameters for the one or more active communication devices in the per-station allocation and/or the dynamic allocation as described above in FIG. 1A, the WAP 114.1 communicates sufficient information to the network server 110 to allow the network server 110 to determine one or more values for the operational parameters. This example can include the network server 110 determining the one or more values for the operational parameters for different types of communication devices as described above in FIG. 1A. This sufficient information can include the one or more distances between the WAP 114.1 and one or more of the active communication devices to provide some examples. In this example, the network server 110 can optionally determine the one or more ceiling values for the operational parameters as described above in FIG. 1A. Thereafter, the WAP 114.1 communicates with one or more active communication devices from among the active communication devices using one or more corresponding values from among the one or more values for the operational parameters as determined by the network server 110. As another example, instead of determining and/or monitoring the one or more distances between the WAP 114.1 and one or more of the active communication devices in the dynamic allocation as described above in FIG. 1A, the WAP 114.1 communicates sufficient information, such as one or more locations of the one or more of the active communication devices, to the network server 110 to allow the network server 110 to determine and/or monitor the one or more distances between the WAP 114.1 and the one or more of the active communication devices.

Exemplary Determining of One or More Values for the Operational Parameters

FIG. 2 illustrates an exemplary operating curve for an exemplary wireless access point (WAP) implemented within the first wireless network and/or the second wireless network according to an exemplary embodiment of the present disclosure. Specifically, FIG. 2 represents a graphical illustration of various received signal strength indicators (RSSIs) of signals received by one or more communication devices, such as one or more of the active communication devices as discussed above in FIG. 1A and FIG. 1B to provide an example, from a WAP, such as the WAP 104.1 or the WAP 114.1 to provide some examples, for various maximum achievable data rates. As illustrated in FIG. 2, the RSSIs of the signals received by one or more communication devices, expressed in decibels (dB), are situated along the x-axis of a Cartesian coordinate system and the various maximum achievable data rates, expressed in megabits per second (MBps), are situated along the y-axis of the Cartesian coordinate system.

As additionally illustrated in FIG. 2, an exemplary operating curve 200 for the WAP can be represented by a linear region 202, a transition region 204, and a saturation region 206. The linear region 202 represents a first region in the exemplary operating curve 200 where the various maximum achievable data rates are proportional to the RSSIs of the signals. In the exemplary embodiment as illustrated in FIG. 2, the linear region 202 represents a linear, or approximately linear, region of the exemplary operating curve 200 whereby changes in the RSSIs of the signals cause linear changes in the various maximum achievable data rates of the signals. For example, the WAP can increase its transmission output power to increase the RSSIs of the signals received by the one or more communication devices which proportionally increases the maximum achievable data rate for these signals. The transition region 204 represents a second region in the exemplary operating curve 200 where the various maximum achievable data rates are no longer directly proportional to the RSSIs of the signals. In the exemplary embodiment as illustrated in FIG. 2, the transition region 204 represents a non-linear, or approximately non-linear, region of the exemplary operating curve 200 whereby changes in the RSSIs of the signals cause non-linear changes in the various maximum achievable data rates of the signals. The saturation region 206 represents a third region in the exemplary operating curve 200 where the various maximum achievable data rates are no longer directly proportional to the RSSIs of the signals. In the exemplary embodiment as illustrated in FIG. 2, the saturation region 206 represents a saturation region of the exemplary operating curve 200 whereby changes in the RSSIs of the signals cause little to no changes in the various maximum achievable data rates of the signals. For example, the WAP can increase its transmission output power to increase the RSSIs of the signals received by the one or more communication devices which causes little to no increase in the maximum achievable data rate for these signals.

In an exemplary embodiment, it is desirable for the WAP to operate in the saturation region 206. In some situations, one or more environmental factors, such as humidity, precipitation, temperature, and/or obstructions from buildings and terrain to provide some examples, can cause the RSSIs of the signals received by the one or more communication devices to fluctuate. However, these fluctuations cause little to no change in the maximum achievable data rate for these signals when the WAP is operating in the saturation region 206. Furthermore, operating in the saturation region 206 allows for more efficient communication between the WAP and the one or more communication devices. For example, the WAP can communicate at a first transmission output power at a first maximum achievable data rate, such as approximately 210 MBps, to provide a RSSI at a first value, such as −40 dB. In this example, the WAP can decrease the transmission output power to be at a second transmission output power which is less than the first transmission output power, to provide a RSSI at a second value, such as −50 dB, which is less than the first value. In this example, the WAP can provide a second maximum achievable data rate, such as approximately 205 MBps, when operating at this second transmission output power. As this example illustrates, the WAP can decrease the RSSI by approximately 10 dB with little change in the maximum achievable data rate, namely from approximately 210 MBps to approximately 205 MBps.

Referring back to FIG. 1A and FIG. 1B above, the WAP 104.1 and/or the network server 110 can determine the one or more values for the operational parameters to cause the WAP 104.1 and/or the WAP 114.1 to operate in the saturation region 206. By operating in the saturation region 206, the WAP 104.1 and/or the WAP 114.1 can operate at a relatively stable maximum achievable data rate when signals being provided by these WAP are effected by the one or more environmental factors.

Exemplary Wireless Access Point (WAP) that can be Implemented within the Wireless Network (WN)

FIG. 3 graphically illustrates block diagram of a wireless access point (WAP) that can be implemented within the wireless network (WN) according to an exemplary embodiment of the present disclosure. A wireless access point (WAP) 300 determines and uses one or more values for operational parameters for one or more communication devices, such from among the active communication devices to provide an example, in the per-station allocation and/or the dynamic allocation as discussed above in FIGS. 1A and 1B. The discussion of the WAP 300 to follow discusses the per-station allocation and the dynamic allocation. Those skilled in the relevant art(s) will recognize that the WAP 300 can perform one or more other functions, such as communicating the wireless networking traffic to provide an example that will be apparent to those skilled in the relevant art(s) without departing from the spirit and scope of the present disclosure. In some situations, these one or more other functions can be prescribed by the one or more communication standards or protocols as discussed in FIG. 1A and FIG. 1B.

The PHY 302 represents an interface between the WAP 300 and the one or more communication devices and/or other WAPs within the WN. The PHY 302 defines electrical and physical specifications for the WAP 300, such a relationship between the WAP 300 and a transmission medium to provide an example. Generally, the PHY 302 modulates, encodes, and/or converts an information frame 350 to provide an information signal 352 for transmission to the WN and/or to the network server over the transmission medium in the downlink direction 320. The PHY 302 establishes and/or terminates one or more connections to the transmission medium to transmit the information signal 352 in the downlink direction 320. The information frame 350 and/or the information signal 352 can include sufficient information, such as distance between the WAP 300 and one or more active communication devices from among the active communication devices to provide an example, to allow a network server, such as the network server 110 to provide an example, to determine one or more values for operational parameters to be used by the WAP 300 as discussed in FIG. 1B. Additionally, the PHY 302 demodulates, decodes, and/or converts an information signal 354 received over the transmission medium to provide an information frame 356 in the uplink direction 322. The PHY 302 establishes and/or terminates one or more connections to the transmission medium to receive the information signal 354 in the uplink direction 322. The information signal 354 and/or the information frame 356 can include information indicating the one or more distances between the WAP 104.1 and one or more of the one or more communication devices as discussed in FIG. 1A and/or one or more values for the one or more operational parameters as determined by the network server as discussed in FIG. 1B. Although not illustrated in FIG. 3, the PHY 302 can include additionally circuitry, such as a power detector to provide an example, to measure various parameters of the information signal 354 to allow the processor to determine the one or more distances between the WAP 104.1 and one or more of the one or more communication devices.

The MAC 304 represents an interface between the PHY 302 and the processor 306. The MAC 304 manages and maintains communication of the WAP 300 by coordinating access to the transmission medium with the other WAPs and formats communication in accordance with one or more communication standards or protocols that are supported by the WAP 300. In the downlink direction 320, the MAC 304 encapsulates or frames a sequence of bits 358 to provide a payload portion of the information frame 350 and appends a preamble portion of the information frame 350 to the payload portion in accordance with the one or more communication standards or protocols, such as any of the communication standards or protocols as discussed above, to the provide the information frame 350. Otherwise, the MAC 304 decapsulates or de-frames the information frame 356 in accordance with the one or more communication standards or protocols to provide a payload portion of the information frame 356 as sequence of bits 360. The MAC 304 can, optionally, authenticate and/or authorize the information frame 356 before decapsulating or de-framing.

The processor 306 controls overall operation and/or configuration of the WAP 300. For example, in the per-station allocation of the one or more operational parameters, as discussed in FIG. 1A and FIG. 1B, the processor 306 determines which communication devices from among the communication devices 102.1 through 102.$k$ are active communication devices and determines the one or more values for the operational parameters for one or more of the active communication devices. In an exemplary embodiment, the one or more values for the operational parameters are selectively chosen such that the WAP 300 operates in the saturation region 206 as discussed in FIG. 2. Alternatively, the processor 306 can receive the one or more values for the operational parameters from the network server. As another example, as discussed in FIG. 1A and FIG. 1B, in the dynamic allocation, the processor 306 monitors the one or more distances between the WAP 300 and the one or more of the active communication devices. The processor 306 can receive one or more of the one or more distances from the one or more communication devices and/or can determine one or more of the one or more distances using the various parameters of the information signal 354 as measured by the PHY 302. The processor 306 can continuously monitor, periodically monitor, or monitor over a discrete period of time the one or more distances. In this other example, the processor 306 determines the one or more values for the operational parameters for the one or more of the active communication devices. In an exemplary embodiment, the one or more values for the operational parameters are selectively chosen such that the WAP 300 operates in the saturation region 206 as discussed in FIG. 2. Alternatively, the processor 306 can receive the one or more values for the operational parameters from the network server. In the per-station allocation and the dynamic allocation, the processor 306 can send one or more commands and/or information to the PHY 302 and/or the MAC 304 to configure the PHY 302 and/or the MAC 304 to operate in accordance with the one or more values. In another exemplary embodiment, the processor 306 can store the one or more values for the operational parameters in a listing in a memory. In this exemplary embodiment, the processor 306 can update the one or more values continuously, periodically, or as needed.

Exemplary Operations of the Processor within the Wireless Access Point (WAP)

FIG. 4 is a flowchart of exemplary operational steps of a processor within the wireless access point (WAP) in the per-station allocation according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 400 of a wireless access point (WAP) within a wireless network, such as one or more of the WAPs 104.1 through 104.n of the WN 100, the WAPs 114.1 through 114.n of the WN 200, or the WAP 300 to provide some examples, in the per-station allocation.

At step 402, the operational control flow 400 determines one or more active communication devices from among communication devices within a geographical coverage area, such as the one or more communication devices 102.1 through 102.k, to provide an example. In some situations, some of the communication devices within the geographical coverage area are not actively communicating with the WAP. These communication devices are referred to as inactive communication devices.

At step 404, the operational control flow 400 determines one or more values for one or more operational parameters of the one or more active communication devices of step 402 as discussed above in FIG. 1A, FIG. 1B, and FIG. 2.

At step 406, the operational control flow 400 uses one or more corresponding values of the one or more values of step 404 to communicate with a corresponding active communication device from among the active communication devices of step 402.

FIG. 5 is a flowchart of exemplary operational steps of a processor within the wireless access point (WAP) in the dynamic allocation according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 500 of a wireless access point (WAP) within a wireless network, such as one or more of the WAPs 104.1 through 104.n of the WN 100, the WAPs 114.1 through 114.n of the WN 200, or the WAP 300 to provide some examples, in the per-station allocation.

At step 502, the operational control flow 500 determines one or more active communication devices from among communication devices within a geographical coverage area, such as the one or more communication devices 102.1 through 102.k, to provide an example. In some situations, some of the communication devices within the geographical coverage area are not actively communicating with the WAP. These communication devices are referred to as inactive communication devices.

At step 504, the operational control flow 500 monitors one or more distances between the WAP and the one of more active communication devices of step 502 as discussed above in FIG. 1A, FIG. 1B, FIG. 2, and FIG. 3.

At step 506, the operational control flow 500 determines whether one or more corresponding distances from among the one or more distances of step 504 have changed before initiating a communication with a corresponding active communication device from among the one of more active communication devices. The operational control flow 500 proceeds to step 508 if the one or more corresponding distances have changed from one or more previous distances for the one or more corresponding distances. Otherwise, the operational control flow 500 proceeds to step 510 when the one or more corresponding distances have not changed from the one or more previous distances.

At step 510, the operational control flow 500 uses one or more corresponding values of the one or more values of step 510 or one or more previously stored values for the one or more operational parameters to communicate with the corresponding active communication device of step 506.

CONCLUSION

The following Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes, and are not intend to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing device). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A wireless access point (WAP) within a wireless network, the WAP comprising:
    a processor configured to:
        determine a first active communication device and a second active communication device from among a plurality of communication devices within a geographical coverage area, and
        determine a first device type based value from among a plurality of device type based values for an operational parameter to be used to communicate with the first active communication device based on a type of the first active communication device and a second device type based value from among the plurality of device type based values for the operational parameter to be used to communicate with the second active communication device based on a type of the second active communication device,
        wherein the first device type based value or the second device type based value is determined to configure the WAP to operate in a saturation region,
        wherein communications with the first active communication device and communications with the second active communication device are associated with a first received signal strength indicator and a second received signal strength indicator, respectively, such that a first change in the first received signal strength indicator or a second change in the second received signal strength indicator causes substantially no change in a data rate provided by the WAP when the WAP is operating in the saturation region, and
        wherein the first device type based value and the second device type based value are less than or equal to a ceiling value from among the plurality of device type based values for the operational parameter that corresponds to a third active communication device from among the plurality of communication devices that is further away from the WAP than the first active communication device and the second active communication device, the ceiling value representing a maximum value for the operational parameter; and
    a physical layer (PHY) device configured to communicate with communication devices being similar types as the first active communication device from among the plurality of communication devices and communication devices being similar types as the second active communication device from among the plurality of communication devices using the first device type based value and the second device type based value, respectively.

2. The WAP of claim 1, wherein the operational parameter comprises a transmission power; a data rate; a modulation scheme; or an encoding scheme.

3. The WAP of claim 1,
    wherein a change in the first device type based value or the second device type based value does not cause a directly proportional change in the data rate provided by the WAP when the WAP is operating in the saturation region.

4. The WAP of claim 1, wherein the processor is further configured to:
    determine a fourth active communication device from among the plurality of communication devices within the geographical coverage area, the first active communication device and the fourth active communication device being different types of communication devices, and
    determine a third device type based value for the operational parameter, different from the first device type based value or the second device type based value, to be used to communicate with the fourth active communication device based on a type of the fourth active communication device, the third device type based value being less than or equal to the ceiling value.

5. The WAP of claim 1, wherein the first active communication device and the second active communication device are similar types of communication devices and at different distances from the WAP.

6. The WAP of claim 5, wherein the similar types of communication devices comprise:
    mobile phones,
    mobile computing devices, or
    mobile internet devices.

7. The WAP of claim 5, wherein the similar types of communication devices comprise:
    different communication devices having a similar manufacturer.

8. The WAP of claim 1, wherein the type of the first active communication device comprises:
    a first manufacturer of the first active communication device; or
    one of a first plurality of communication devices manufactured by the first manufacturer; and
    wherein the type of the second active communication device comprises:
        a second manufacturer of the second active communication device; or
        one of a second plurality of communication devices manufactured by the second manufacturer.

9. A method for operating a wireless access point (WAP) within a wireless network, the method comprising:
    determining a first active communication device and a second active communication device from among a plurality of communication devices within a geographical coverage area, the first active communication device and the second active communication device being similar types of communication devices and being at different distances from the WAP;
    determining a device type based value from among a plurality of device type based values for an operational parameter to be used to communicate with the first active communication device and the second active communication device based on a type of the first active communication device and the second active communication device,
wherein the device type based value is determined to cause the WAP to operate in a saturation region,
wherein communications with the first active communication device and communications with the second active communication device are associated with a first received signal strength indicator and a second received signal strength indicator such that a first change in the first received signal strength indicator or a second change in the second received signal strength indicator causes substantially no change in a data rate provided by the WAP when the WAP is operating in the saturation region, and
wherein the device type based value is determined to be less than or equal to a ceiling value for the operational parameter corresponding to a third active communication device from among the plurality of communication devices that is further away from the WAP than the first active communication device and the second active communication device, the ceiling value representing a maximum value for the operational parameter to be used to determine the plurality of device type based values for the operational parameter to be used to communicate with the plurality of communication devices; and
communicating with communication devices being similar types as the first active communication device and the second active communication device from among the plurality of communication devices using the device type based value.

10. The method of claim 9, wherein the operational parameter comprises a transmission power; a data rate; a modulation scheme; or an encoding scheme.

11. The method of claim 9, wherein a change in the device type based value does not cause a directly proportional change in the data rate provided by the WAP when the WAP is operating in the saturation region.

12. The method of claim 9, wherein the similar types of communication devices comprise:
mobile phones,
mobile computing devices, or
mobile internet devices.

13. The method of claim 9, wherein the similar types of communication devices comprise:
different communication devices having a similar manufacturer.

14. The method of claim 9, further comprising:
determining a fourth active communication device from among the plurality of communication devices within the geographical coverage area, the first active communication device and the fourth active communication device being different types of communication devices; and
determining a second device type based value for the operational parameter, different from the device type based value, to be used to communicate with the fourth active communication device based on a type of the fourth active communication device, the second device type based value being less than or equal to the ceiling value.

15. The method of claim 9, wherein the type of the first active communication device and the second active communication device comprises:
a manufacturer of the first active communication device and the second active communication device; or
one of a plurality of communication devices manufactured by the manufacturer.

16. A wireless access point (WAP) within a wireless network, the WAP comprising:
a processor configured to:
determine a first active communication device and a second active communication device from among a plurality of communication devices within a geographical coverage area, and
receive a first device type based value from among a plurality of device type based values for an operational parameter to be used to communicate with the first active communication device and a second device type based value from among the plurality of device type based values for the operational parameter to be used to communicate the second active communication device, the first device type based value and the second device type based value being based on a type of the first active communication device and a type of the second active communication device, respectively,
wherein the first device type based value or the second device type based value is determined to configure the WAP to operate in a saturation region,
wherein communications with the first active communication device and communications with the second active communication device are associated with a first received signal strength indicator and a second received signal strength indicator, respectively, such that a first change in the first received signal strength indicator or a second change in the second received signal strength indicator causes substantially no change in a data rate provided by the WAP when the WAP is operating in the saturation region, and
wherein the first device type based value and the second device type based value are less than or equal to a ceiling value from among the plurality of device type based values for the operational parameter that corresponds to a third active communication device from among the plurality of communication devices that is further away from the WAP than the first active communication device and the second active communication device, the ceiling value representing a maximum value for the operational parameter; and
a physical layer (PHY) device configured to communicate with communication devices being similar types as the first active communication device from among the plurality of communication devices and communication devices being similar types as the second active communication device from among the plurality of communication devices using the first device type based value and the second device type based value, respectively.

17. The WAP of claim 16, wherein the operational parameter comprises a transmission power; a data rate; a modulation scheme; or an encoding scheme.

18. The WAP of claim 16, wherein a change in the first device type based value or the second device type based value does not cause a directly proportional change in the data rate provided by the WAP when the WAP is operating in the saturation region.

19. The WAP of claim 16, wherein the first active communication device and the second active communication device are similar types of communication devices and at different distances from the WAP.

20. The WAP of claim 19, wherein the similar types of communication devices comprise:
mobile phones,
mobile computing devices, or
mobile internet devices.

21. The WAP of claim 19, wherein the similar types of communication devices comprise:
different communication devices having a similar manufacturer.

22. The WAP of claim 16, wherein the processor is further configured to:
determine a fourth active communication device from among the plurality of communication devices within the geographical coverage area, the first active communication device and the fourth active communication device being different types of communication devices, and
receive a third device type based value for the operational parameter, different from the first device type based value or the second device type based value, from the wireless network to be used to communicate with the fourth active communication device, the third device type based value being less than or equal to the ceiling value.

23. The WAP of claim 16, wherein the type of the first active communication device comprises:
a first manufacturer of the first active communication device; or
one of a first plurality of communication devices manufactured by the first manufacturer; and
wherein the type of the second active communication device comprises:
a second manufacturer of the second active communication device; or
one of a second plurality of communication devices manufactured by the second manufacturer.

* * * * *

UNITED STATES PATENT AND TRADEMARK OFFICE
CERTIFICATE OF CORRECTION

PATENT NO. : 10,306,487 B1
APPLICATION NO. : 15/190561
DATED : May 28, 2019
INVENTOR(S) : Linkola Page 1 of 1

It is certified that error appears in the above-identified patent and that said Letters Patent is hereby corrected as shown below:

In the Claims

In Column 12, Claim 3, Lines 8-12, delete "wherein a…………saturation region." and insert the same at Line 7, after "claim 1," as a continuation point.

Signed and Sealed this
Eleventh Day of August, 2020

Andrei Iancu
*Director of the United States Patent and Trademark Office*